Figure 1:
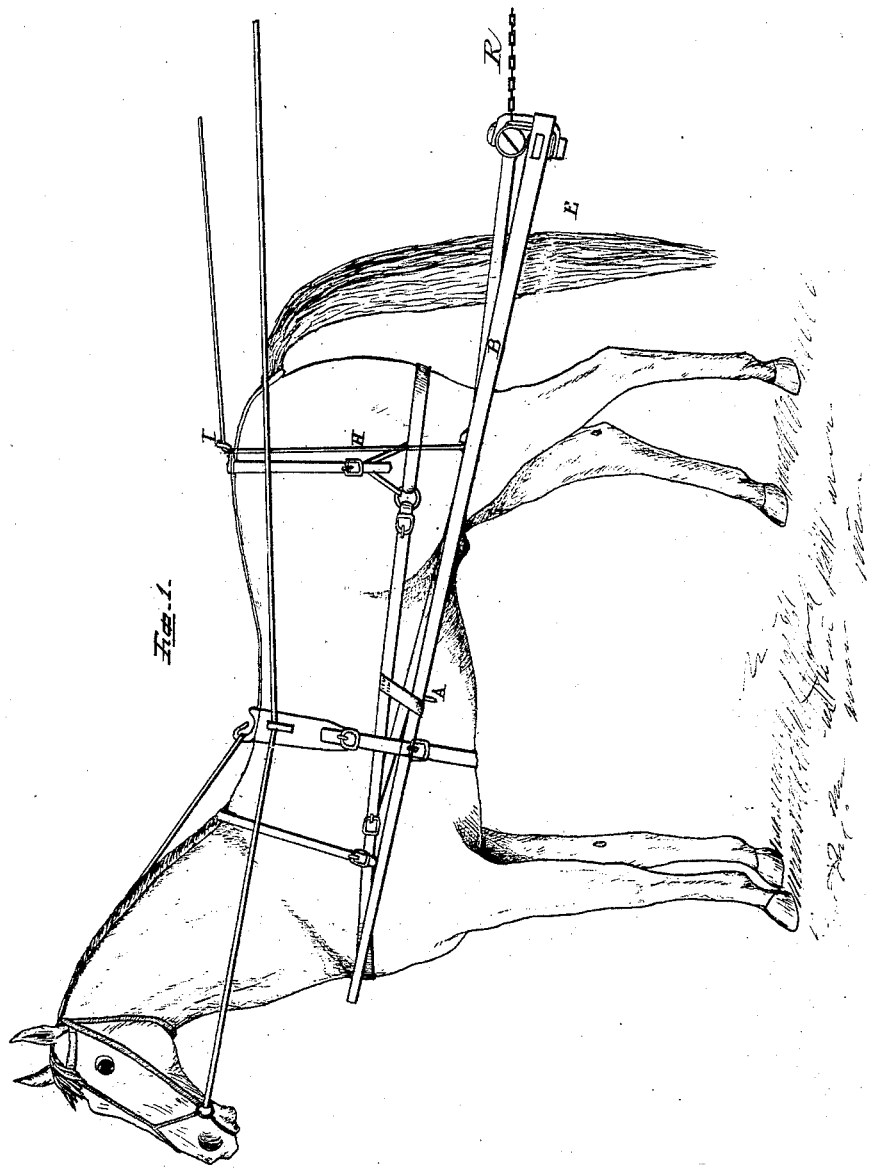

(No Model.)

J. A. HARMAN.
Horse Detacher.

No. 232,027.   Patented Sept. 7, 1880.

Witnesses=
W. W. Mortimer
Will A. Kern

Inventor=
Jno. A. Harman,
per
F. A. Lehmann,
Atty.

(No Model.)  2 Sheets—Sheet 2.
J. A. HARMAN.
Horse Detacher.
No. 232,027. Patented Sept. 7, 1880.
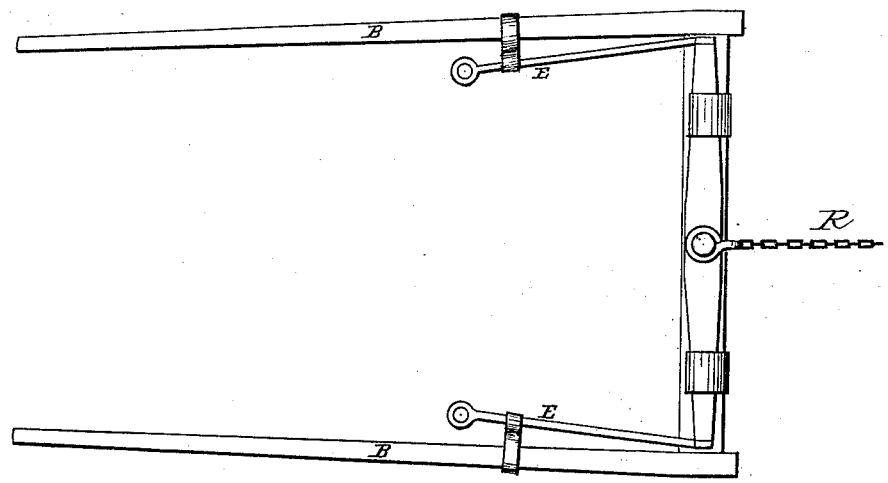
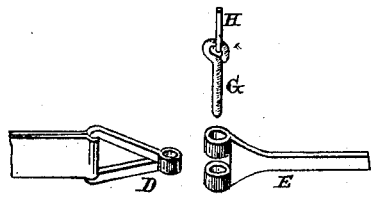
Witnesses:
W. W. Mortimer.
Will. H. Kern.
Inventor:
Jno. A. Harman,
per
F. A. Lehmann,
Atty.

UNITED STATES PATENT OFFICE.

JOHN A. HARMAN, OF LEXINGTON COURT-HOUSE, SOUTH CAROLINA.

HORSE-DETACHER.

SPECIFICATION forming part of Letters Patent No. 232,027, dated September 7, 1880.

Application filed July 10, 1880. (No model.)

*To all whom it may concern:*

Be it known that I, JOHN A. HARMAN, of Lexington Court-House, in the county of Lexington and State of South Carolina, have invented certain new and useful Improvements in Detaching Horses; and I do hereby declare the following to be a full, clear, and exact description of the invention, such as will enable others skilled in the art to which it pertains to make and use it, reference being had to the accompanying drawings, which form part of this specification.

My invention relates to an improvement in detaching horses; and it consists in attaching the rear ends of the traces to iron rods which project forward from the single-tree by means of pins, which pins have straps connected to them which pass up through a ring on top of the crupper and thence back to the vehicle, so that should the horse at any time become unmanageable the driver has simply to pull upon the straps and draw out the pins so as to detach the traces and thus free the horse from the shafts, as will be more fully described hereinafter.

Figure 1 is a side elevation of my invention. Fig. 2 is a plan view of the shafts, showing the rods to which the rear ends of the traces are fastened. Fig. 3 is a perspective of the fastening on the trace.

In carrying my invention into practice any suitable harness that may be preferred can be used upon the horse, with the exception that the holdback-straps are to be provided with loops at any suitable point, so as to slip over the front ends of the shafts until they strike against the stops A, which are secured to the under side of the shafts B.

The traces are made much shorter than usual, so as to reach back to only a little in front of or opposite to the horse's flanks, and each one is provided with a suitable fastening device, D, which has an eye made through its rear end.

Fastened to each end of the single-tree is an iron rod, E, which projects forward so as to couple with the traces, and which rod has its end forked, and a hole made through each one of the prongs of the fork, so that after the fastening D on the rear end of the trace has been placed between the prongs and this fork the pins G can be passed down through them so as to fasten the two parts firmly together. Fastened to the upper end of each one of these pins is a strap, H, which passes up over the back of the horse, and then through a ring or guide, I, back to the vehicle. When these straps are pulled upon the pins are pulled out of their sockets, and thus the traces are detached and the horse is free to go forward out of the shafts.

By means of the above-described construction it will readily be seen that should the horse at any time become unmanageable the driver has only to give a pull upon the strap which is fastened to the top of the dash-board, and he can at once detach the horse from the vehicle.

As soon as the horse has pulled the holdback-loops from off the ends of the shafts the shafts do not drop upon the ground, where they would be in danger of catching between the horse's legs or having their front ends broken, but are kept from coming in contact with the ground by means of a chain, R, which is attached to the spring-loop S at its front end and to the vehicle at its rear end.

I am aware that the shafts have been attached to the vehicle by means of pins which could be withdrawn so as to detach the horse; but in that case the horse carries the shafts away with him, and this renders the vehicle unfit for use, as there is no means of fastening another pair of shafts to the vehicle, and this I disclaim.

By making the traces detachable, as here shown, there is no need of any special construction in the shafts or springs and other attachments.

Having thus described my invention, I claim—

The combination of the iron rods which extend forward from the ends of the single-tree, and which rods have forked and perforated ends, with the traces, provided with fastening devices which have perforated ends, pins to fasten the traces and rods together, and straps connected to the upper ends of the pins, and a guide or ring that is attached to the harness on the horse's back, the parts being arranged and combined to operate substantially as shown and described.

In testimony that I claim the foregoing I have hereunto set my hand this 28th day of June, 1880.

JOHN A. HARMAN.

Witnesses:
HENRY A. MUTZE,
S. P. WINGARD.